US010336300B2

(12) United States Patent
Ijima

(10) Patent No.: US 10,336,300 B2
(45) Date of Patent: Jul. 2, 2019

(54) WIPER CONTROL APPARATUS

(71) Applicant: ASMO CO., LTD., Kosai-shi, Shizuoka (JP)

(72) Inventor: Hiroto Ijima, Hamamatsu (JP)

(73) Assignee: DENSO CORPORATION, Kosai-shi, Shizuoka ( * ) Notice: Subject to any disclaimer, the term of this patent is extended or adjusted under 35 U.S.C. 154(b) by 0 days.

(21) Appl. No.: 15/534,488

(22) PCT Filed: Dec. 10, 2015

(86) PCT No.: PCT/JP2015/084675
§ 371 (c)(1),
(2) Date: Jun. 9, 2017

(87) PCT Pub. No.: WO2016/093314
PCT Pub. Date: Jun. 16, 2016

(65) Prior Publication Data
US 2017/0361810 A1 Dec. 21, 2017

(30) Foreign Application Priority Data
Dec. 12, 2014 (JP) ................................ 2014-252360

(51) Int. Cl.
*B60S 1/08* (2006.01)
(52) U.S. Cl.
CPC ............... *B60S 1/0807* (2013.01); *B60S 1/08* (2013.01)

(58) Field of Classification Search
CPC ................................ B60S 1/0807; B60S 1/08
See application file for complete search history.

(56) References Cited

U.S. PATENT DOCUMENTS

| 5,892,343 A * | 4/1999 | Mack ........................ B60S 1/08 15/250.13 |
| 2004/0075409 A1 * | 4/2004 | Hospital ................... B60S 1/08 318/443 |

FOREIGN PATENT DOCUMENTS

| JP | 2009-512593 A | 3/2009 |
| JP | 2011-512285 A | 4/2011 |
| JP | 2013-199244 A | 10/2013 |
| JP | 5535738 B2 | 7/2014 |

* cited by examiner

*Primary Examiner* — Behrang Badii
*Assistant Examiner* — Daniel L Greene
(74) *Attorney, Agent, or Firm* — Solaris Intellectual Property Group, PLLC

(57) ABSTRACT

Turning angles of an output shaft of a wiper motor are detected by a turning angle sensor. In a case in which a wiper switch is switched off, a wiper control circuit performs control to stop a wiper blade at a stowed position, which is a stop reference position, on the basis of a position of the wiper blade calculated from a detected turning angle. If the wiper blade stops at a position that is different from the stop reference position, the wiper control circuit sets this stop position as a new stop reference position. In a case in which the wiper switch is subsequently switched on again, the wiper control circuit performs control to move the wiper blade from the new stop reference position.

5 Claims, 5 Drawing Sheets

WIPER CONTROL APPARATUS

TECHNICAL FIELD

The present invention relates to a wiper control apparatus.

BACKGROUND ART

A wiper device that moves a driver seat side wiper blade and a passenger seat side wiper blade with a single wiper motor features a linking mechanism that transmits rotary force from the wiper motor to wiper arms. The linking mechanism features a function that, when an external force caused by running wind of the vehicle or the like acts on a wiper blade or wiper arm, inhibits movement of the wiper blade to an unintended position by the external force.

In contrast, wiper devices that move a driver seat side wiper blade and a passenger seat side wiper blade with respectively separate motors often have no linking mechanism between a wiper arm and the wiper motor. In this wiper device, when a wiper blade is subjected to an external force caused by running wind of the vehicle or the like, there is a higher probability of the wiper blade moving to an unintended position than in a wiper device with a linking mechanism.

Japanese Patent No. 5,535,738 discloses the invention of a wiper control apparatus and a wiper device control method in which, when a wiper arm has stopped outside a tolerance range of a stop position due to the action of an external force or the like, a wiper motor is operated and the wiper arm is moved to within the tolerance range of the stop position.

Japanese Patent Application National Publication Nos. 2009-512593 and 2011-512285 disclose the invention of wiper devices in which, even in a state in which an ignition switch of a vehicle has been switched off, a wiping angle of a wiper is periodically detected. If the wiping angle has changed from a target position, a motor turns and the wiping angle is set to the target position.

SUMMARY OF INVENTION

Technical Problem

However, the technology disclosed in Japanese Patent No. 5,535,738 has a disadvantage in that moving a wiper arm that has stopped near a stowed position to a predetermined position is an unnatural movement, which may cause unease to a user or concern that the wiper device is malfunctioning or the like.

Meanwhile, the respective technologies disclosed in Japanese Patent Application National Publication Nos. 2009-512593 and 2011-512285 have a disadvantage in that moving a wiper arm to a predetermined position in the state in which the ignition switch of the vehicle has been switched off is an unnatural movement, which may cause unease to a user or concern that the wiper device is malfunctioning or the like.

An embodiment of the present invention has been made in consideration of the circumstances described above, and an object of the present invention is to provide a wiper control apparatus with which movement of a wiper blade when a stop position of the wiper blade has been disturbed by an external force does not cause a user to feel unease.

Solution to Problem

In order to solve the problem described above, the present disclosure includes: a position calculation section that calculates a position of a wiper blade on a windshield from a turning angle of an output shaft of a wiper motor, the turning angle being detected by a turning angle detection unit; and a control section that, in a case in which an operation signal is inputted, controls the wiper blade to reciprocatingly move and conduct a wiping movement on the windshield, in a case in which a stop signal is inputted, controls the wiper blade to stop on the basis of a calculated position of the wiper blade on the windshield and a stop reference position, and in a case in which the operation signal is subsequently inputted, sets a position at which the wiper blade is stopped as a new the stop reference position and controls the wiper blade to conduct the wiping movement from the new stop reference position.

According to this wiper control apparatus, the position at which the wiper blade has stopped is set as the new stop reference position; no control is performed to move the position of the wiper blade to the original stop reference position after stopping. Therefore, if the stop position of the wiper blade is disturbed by an external force, a movement of the wiper blade causing a user to feel unease may be prevented.

In the present disclosure, in a case in which the wiper blade stops at a stop position that is different from the stop reference position, the control section sets the stop position as the new stop reference position.

According to this wiper control apparatus, in a case in which the wiper blade is stopped at a position different from the stop reference position, this different position is set as the new stop reference position. Therefore, if the stop position of the wiper blade is disturbed by an external force, a movement of the wiper blade causing a user to feel unease may be prevented.

In the present disclosure, if the wiper blade is stopped at the stop reference position, the control section causes the wiper blade to conduct the wiping movement from the stop reference position in a case in which the operation signal is subsequently inputted.

According to this wiper control apparatus, in a case in which the wiper blade is stopped at the original stop reference position, movement of the wiper blade is started from the original stop reference position. Therefore, a movement of the wiper blade causing a user to feel unease may be prevented.

The present disclosure further includes a memory unit that memorizes the new stop reference position, wherein, if a position of the wiper blade on the windshield that is calculated by the position calculation section in a case in which the operation signal is inputted is different from the new stop reference position memorized by the memory unit, the control section calculates an additional applied voltage to be applied to the wiper motor for moving the wiper blade to the new stop reference position, and performs control to apply to the wiper motor both the additional applied voltage and a voltage that is to be applied to the wiper motor for causing the wiper blade to conduct the wiping movement from the new stop reference position.

According to this wiper control apparatus, if the position of the wiper blade is changed by the action of an external force after the wiper blade has stopped at the new stop reference position, then in a case in which the operation signal is subsequently inputted to switch on the wiper device, an additional applied voltage for correcting the position of the wiper blade is calculated. Hence, the additional applied voltage and the applied voltage for usual operation are applied to the wiper motor. Thus, an unnatural correction of the position of the wiper blade causing a user to feel unease may be prevented.

In the present disclosure, the control section performs the control to apply the additional applied voltage to the wiper motor if a duty ratio of the additional applied voltage is equal to or larger than a threshold value.

According to this wiper control apparatus, if the duty ratio of the additional applied voltage is small, that is, if the change in the position of the wiper blade after stopping is small, the additional applied voltage is not applied to the wiper motor. Therefore, an unnatural correction of the position of the wiper blade causing a user to feel unease may be prevented.

In the present disclosure, the operation signal is inputted to the control section in a case in which a wiper switch is switched on, the wiper switch being operable to switch movement of the wiper blade on and off and to switch a speed of the reciprocating movement of the wiper blade, and the stop signal is inputted to the control section in a case in which the wiper switch is switched off.

According to this wiper control apparatus, movements of the wiper blade may be switched on and off by operation of the wiper switch.

DESCRIPTION OF EMBODIMENTS

Figure 1:
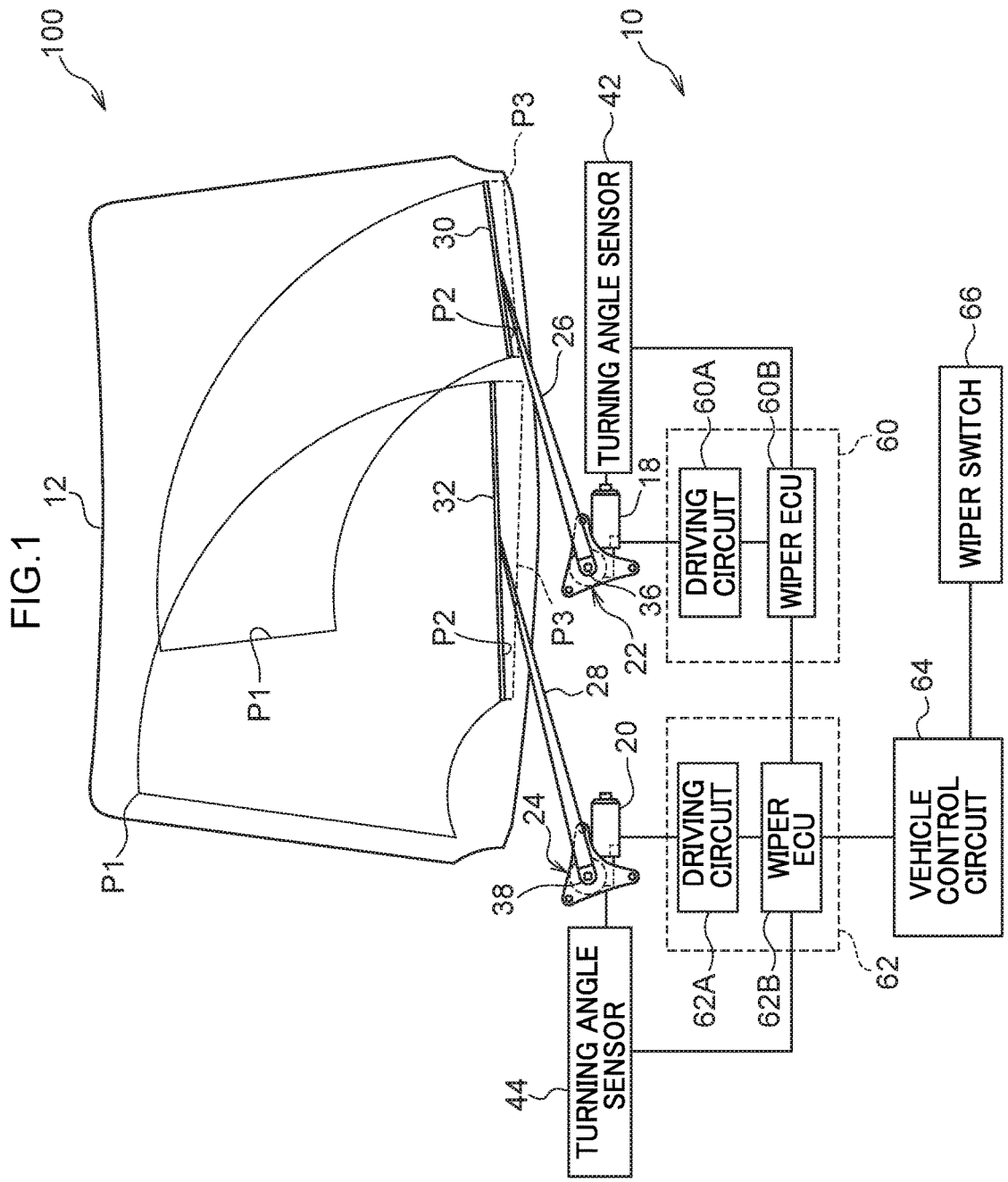
FIG. 1 is a schematic diagram showing an example of structures of a wiper device including a wiper control apparatus according to a present exemplary embodiment.

FIG. 1 is a schematic diagram showing an example of structures of a wiper device 100 including a wiper control apparatus 10 according to a present exemplary embodiment. As an example, the wiper device 100 is a tandem-type wiper device in which a left wiper apparatus 14 is provided at the left (a passenger seat side) of a lower portion of a windshield glass 12 of a vehicle, and a right wiper apparatus 16 is provided at the right (a driver seat side) of the lower portion of the windshield glass 12 of the vehicle. In the present exemplary embodiment, the terms "left" and "right" refer to the left and right as viewed from inside a passenger cabin of the vehicle.

The left wiper apparatus 14 and the right wiper apparatus 16 are equipped with, respectively, a wiper motor 18 or 20, a reduction gear mechanism 22 or 24, a wiper arm 26 or 28, and a wiper blade 30 or 32. The wiper motors 18 and 20 are provided at the lower left and lower right, respectively, of the windshield glass 12.

Forward and backward rotations of the wiper motors 18 and 20 of the left wiper apparatus 14 and right wiper apparatus 16 are respectively geared down by the reduction gear mechanisms 22 and 24. Output shafts 36 and 38 are respectively turned by the forward and backward rotations geared down by the reduction gear mechanisms 22 and 24. Each of the wiper arms 26 and 28 is moved from a stowed position P3 to a lower reversing position P2, and is reciprocatingly moved between the lower reversing position P2 and an upper reversing position P1, by rotary force of the forward and backward turning of the output shaft 36 or 38 acting on the wiper arm 26 or 28. As a result of the movements of the wiper arms 26 and 28, the wiper blades 30 and 32 provided at distal ends of, respectively, the wiper arms 26 and 28 wipe the surface of the windshield glass 12 between the lower reversing positions P2 and the upper reversing positions P1. The reduction gear mechanisms 22 and 24 are structured with, for example, worm gears or the like. The reduction gear mechanisms 22 and 24 gear down rotations of the wiper motors 18 and 20 to a rotary speed suitable for the wiper blades 30 and 32 to wipe the surface of the windshield glass 12 and turn the output shafts 36 and 38, respectively, at this rotary speed.

As described above, each of the wiper motors 18 and 20 according to the present exemplary embodiment includes the reduction gear mechanism 22 or 24 structured with a worm gear. Therefore, turning speeds and turning angles of the output shafts 36 and 38 are not the same as turning speeds and turning angles of the main bodies of the wiper motors 18 and 20. However, in the present exemplary embodiment, the wiper motors 18 and 20 and the reduction gear mechanisms 22 and 24 are respectively structured to be integral and indivisible. Accordingly, the turning speeds and turning angles of the output shafts 36 and 38 are treated as respective turning speeds and turning angles of the wiper motors 18 and 20 herebelow.

Each of the wiper motors 18 and 20 is connected to, respectively, a wiper control circuit 60 or 62 that controls rotation of the wiper motor 18 or 20. The wiper control circuit 60 relating to the present exemplary embodiment includes a driving circuit 60A and a wiper ECU 60B, and the wiper control circuit 62 includes a driving circuit 62A and a wiper ECU 62B.

A turning angle sensor 42 that detects both turning speeds and turning angles of the output shaft 36 of the wiper motor 18 is connected to the wiper ECU 60B. A turning angle sensor 44 that detects both turning speeds and turning angles of the output shaft 38 of the wiper motor 20 is connected to the wiper ECU 62B. Each of the wiper ECUs 60B and 62B calculates positions of the wiper blade 30 or 32 on the windshield glass 12 on the basis of signals from the turning angle sensor 42 or 44. The wiper ECU 60B or 62B controls the driving circuit 60A or 62A so as to alter the turning speed of the output shaft 36 or 38 in accordance with the calculated positions. Each of the output shafts 36 and 38 is provided inside the reduction gear mechanism 22 or 24 of the wiper motor 18 or 20. The turning angle sensor 42 or 44 converts magnetic fields (magnetic forces) of an excitation coil or magnet that turns in association with the output shaft 36 or 38 to electric currents and detects the same.

The driving circuit 60A or 62A generates voltage (and current) for operating the wiper motor 18 or 22 by pulse width modulation (PWM) control and supplies the voltage to the wiper motor 18 or 20. The driving circuit 60A or 62A includes a circuit employing field-effect transistors (MOSFETs) in switching components. The driving circuit 60A outputs a voltage with a predetermined duty ratio under the control of the wiper ECU 60B, and the driving circuit 62A outputs a voltage with a predetermined duty ratio under the control of the wiper ECU 62B.

The wiper ECU 60B and wiper ECU 62B synchronize movements of the left wiper apparatus 14 and the right wiper apparatus 16 by coordination by, for example, communications using a protocol such as Local Interconnect Network (LIN) or the like. A wiper switch 66 is connected to the wiper ECU 62B of the wiper control circuit 62 via a vehicle control circuit 64.

The wiper switch 66 is a switch that switches on and off supplies of electric power to the wiper motors 18 and 20 from a battery of the vehicle. The wiper switch 66 can be switched to a low-speed operation mode selection position to move the wiper blades 30 and 32 at a low speed, a high-speed operation mode selection position to move the wiper blades 30 and 32 at a high speed, an intermittent operation mode selection position to move the wiper blades 30 and 32 intermittently at a constant interval, and a stop mode selection position. In accordance with the selection position of each mode, command signals causing the wiper motors 18 and 20 to rotate are outputted to the wiper ECU 62B via the vehicle control circuit 64. The command signals inputted to the wiper ECU 62B are also inputted to the wiper ECU 60B by the above-mentioned communications using a protocol such as LIN.

When signals outputted from the wiper switch 66 in accordance with the selection position of each mode are inputted to the wiper ECUs 60B and 62B, the wiper ECUs 60B and 62B perform control in response to the output signals from the wiper switch 66. In specific terms, the wiper ECUs 60B and 62B calculate turning speeds of the output shafts 36 and 38 in accordance with the command signals from the wiper switch 66, and the wiper ECUs 60B and 62B control the driving circuits 60A and 62A such that the output shafts 36 and 38 turn at the calculated turning speeds.

Figure 2:
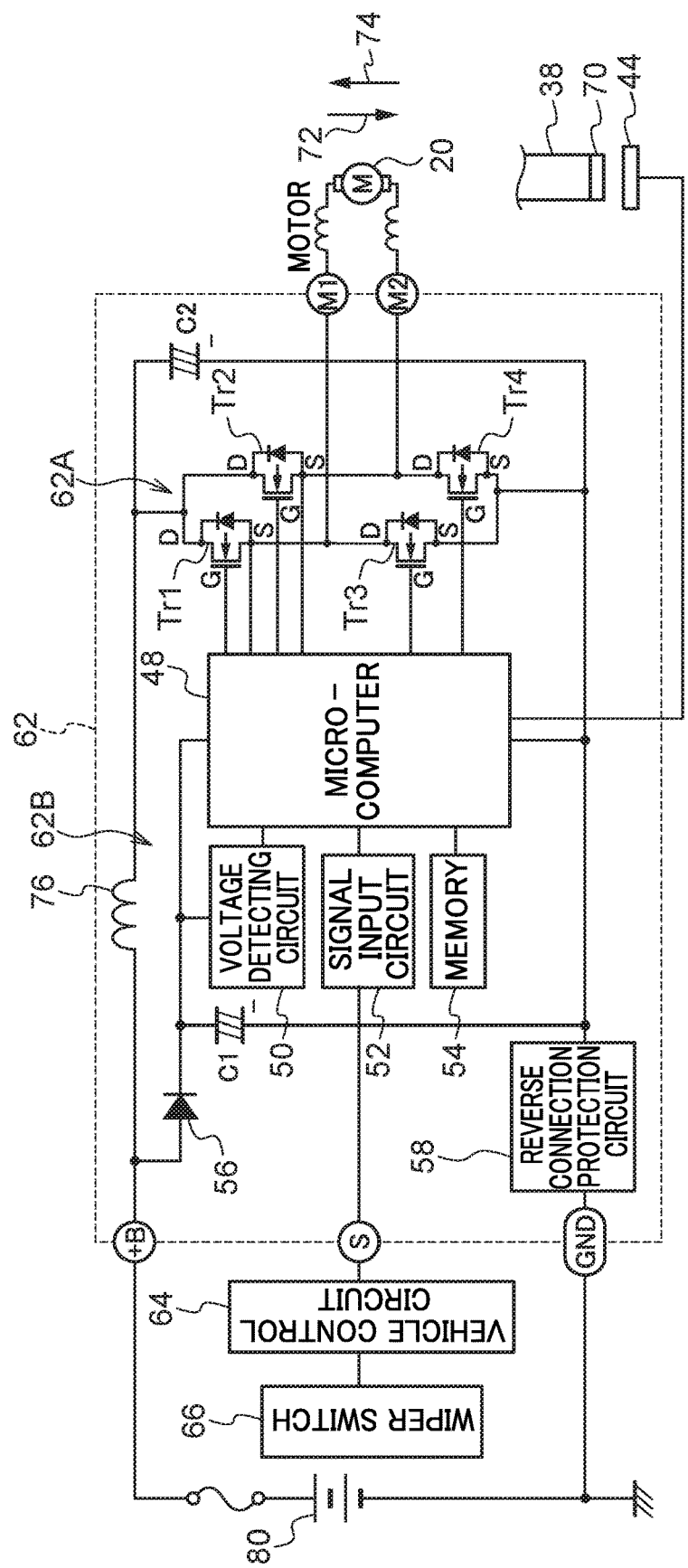
FIG. 2 is a block diagram showing schematics of an example of configuration of a wiper control circuit of a right wiper device according to the present exemplary embodiment.

FIG. 2 is a block diagram showing schematics of an example of configuration of the wiper control circuit 62 of the right wiper apparatus 16 according to the present exemplary embodiment. The wiper motor 20 shown in FIG. 2 is, for example, a brushed DC motor. The configuration of the wiper control circuit 60 of the left wiper apparatus 14 is similar to the wiper control circuit 62 of the right wiper apparatus 16. Therefore, detailed descriptions thereof are not given here.

The wiper control circuit 62 shown in FIG. 2 includes the driving circuit 62A, which generates voltages to be applied to coil terminals of the wiper motor 20, and a microcomputer 48 of the wiper ECU 62B, which controls a switching component structuring the driving circuit 62A to switch the switching component on and off. Electric power from a battery 80 is supplied to the microcomputer 48 via a diode 56, the voltage of the supplied electric power is detected by a voltage detecting circuit 50 provided between the diode 56 and the microcomputer 48, and detected results are outputted to the microcomputer 48. An electrolytic capacitor C1 is provided, of which one end is connected between the diode 56 and the microcomputer 48 and the other end (−) is connected to ground. The electrolytic capacitor C1 is a capacitor for stabilizing a power supply of the microcomputer 48. The electrolytic capacitor C1 protects the microcomputer 48 by, for example, storing sudden high voltages such as surges and the like and bypassing the stored high voltages to a ground region.

Control signals for designating a turning speed of the wiper motor 18 are inputted from the wiper switch 66 and the vehicle control circuit 64 to the microcomputer 48 via a signal input circuit 52. If the command signals outputted from the wiper switch 66 are analog signals, these signals are converted to digital signals in the signal input circuit 52 and inputted to the microcomputer 48.

The turning angle sensor 44 is connected to the microcomputer 48. The turning angle sensor 44 detects a magnetic field in a sensor magnet 70 that changes in accordance with turning of the output shaft 38. On the basis of signals outputted by the turning angle sensor 44, the microcomputer 48 calculates turning angles of the output shaft 38, and hence identifies positions of the wiper blades 30 and 32 on the windshield glass 12.

Data on rotation speeds of the wiper motor 20 that are specified for positions of the wiper blades 30 and 32 is memorized in a memory 54. The microcomputer 48 refers to this data and controls the driving circuit 62A such that the wiper motor 20 rotates a number of rotations corresponding to the identified positions of the wiper blades 30 and 32.

As shown in FIG. 2, the driving circuit 62A employs transistors Tr1, Tr2, Tr3 and Tr4, which are field-effect transistors (FETs), in the switching component. The respective drains of transistor Tr1 and transistor Tr2 are connected to the battery 80 via a noise prevention coil 76. The sources of transistor Tr1 and transistor Tr2 are connected to the drains of transistor Tr3 and transistor Tr4, respectively. The sources of transistor Tr3 and transistor Tr4 are connected to ground.

The source of transistor Tr1 and drain of transistor Tr3 are connected to one end of a coil of the wiper motor 18, and the source of transistor Tr2 and drain of transistor Tr4 are connected to the other end of the coil of the wiper motor 20.

When a high-level signal is applied to the respective gates of transistor Tr1 and transistor Tr4, transistor Tr1 and transistor Tr4 switch on, and, for example, a clockwise current 72 that moves the wiper blades 30 and 32 to turn clockwise as seen from the passenger compartment flows to the wiper motor 20. The voltage of the clockwise current 72 may be modulated by controlling one of transistor Tr1 and transistor Tr4 to switch on and controlling the other to switch off on and off in short intervals by PWM control.

When the high-level signal is applied to the respective gates of transistor Tr2 and transistor Tr3, transistor Tr2 and transistor Tr3 switch on, and, for example, a counterclockwise current 74 that moves the wiper blades 30 and 32 to turn counterclockwise as seen from the passenger compartment flows to the wiper motor 20. The voltage of the counterclockwise current 74 may be modulated by controlling one of transistor Tr2 and transistor Tr3 to switch on and controlling the other to switch off on and off in short intervals by PWM control.

In the present exemplary embodiment, a reverse connection protection circuit 58 and the noise prevention coil 76 are provided between the battery 80 and the driving circuit 62A, and an electrolytic capacitor C2 is provided in parallel with the driving circuit 62A. The noise prevention coil 76 is a component that is for suppressing noise generated by switching of the driving circuit 62A.

The electrolytic capacitor C2 moderates noise generated from the driving circuit 62A, stores sudden high voltages such as surges and the like, and bypasses the stored high voltages to the ground region. Thus, the electrolytic capacitor C2 is a component that is for preventing inputs of excessive current to the driving circuit 62A.

The reverse connection protection circuit 58 is a circuit that is for protecting the components that form the wiper control circuit 62 if the positive and negative terminals of the battery 80 are connected the opposite way round to the way shown in FIG. 2. The reverse connection protection circuit 58 is structured by, for example, a "diode-connected" FET whose drain and gate are connected to one another, or the like.

Figure 3:
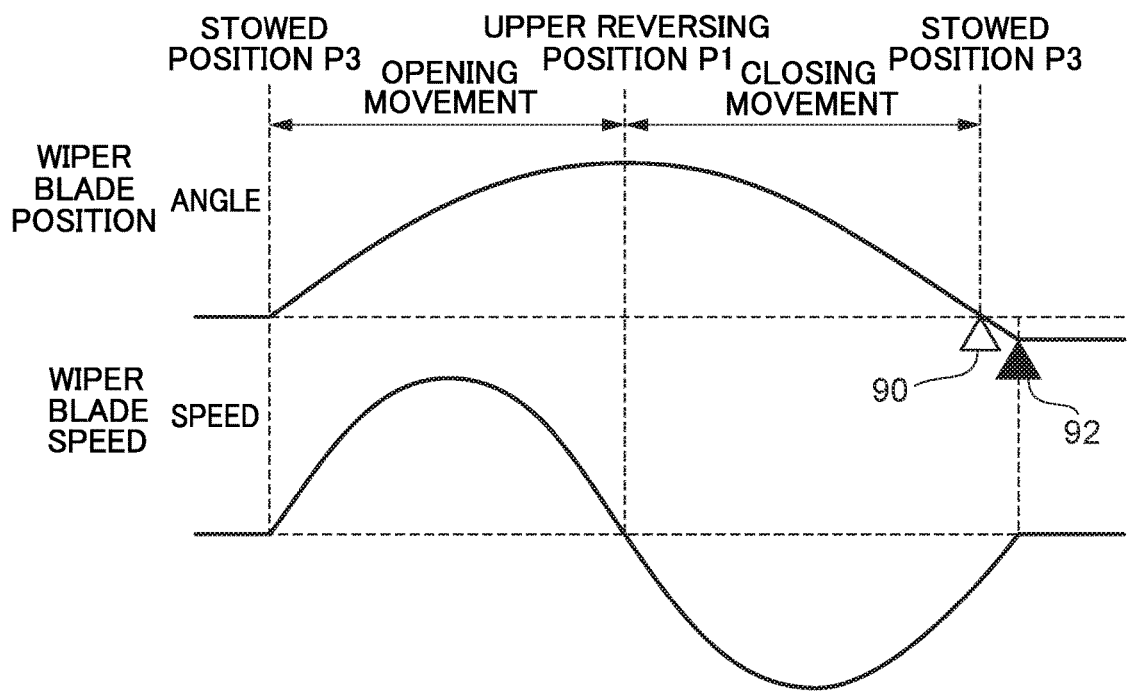
FIG. 3 is a schematic diagram showing an example of movement of a wiper blade according to the present exemplary embodiment.

Now, operation and effects of the wiper control apparatus 10 according to the present exemplary embodiment are described. FIG. 3 is a schematic diagram showing an example of movement of the wiper blades 30 and 32 according to the present exemplary embodiment. The upper part of FIG. 3 shows changes of position of the wiper blade 30 or 32, showing correspondences between positions on the windshield glass 12, the horizontal axis, and turning angles of the output shaft 36 or 38, the vertical axis. The lower part of FIG. 3 shows correspondences between speeds of the wiper blade 30 or 32, the vertical axis, and positions of the wiper blade 30 or 32 on the windshield glass 12, the horizontal axis.

FIG. 3 illustrates a case in which the wiper blade 30 or 32 starts with an opening operation, which is a movement from the stowed position P3, reverses direction at the upper reversing position P1, starts a closing operation after reversing to return to the stowed position P3, and stops at the stowed position P3. As shown in the upper part of FIG. 3, the turning angle of the output shaft 36 or 38 reaches a maximum when the wiper blade 30 or 32 reaches the upper reversing position P1 in the opening operation, decreases in the closing operation after the wiper blade 30 or 32 has reversed direction at the upper reversing position P1, and reaches zero when the wiper blade 30 or 32 reaches the stowed position P3.

In the present exemplary embodiment, a position of the wiper blade 30 or 32 on the windshield glass 12 is calculated from a turning angle of the output shaft 36 or 38 of the wiper motor 18 or 20 detected by the turning angle sensor 42 or 44. Control is performed to stop the wiper blade 30 or 32 at the stowed position P3 by reference to the calculated position of the wiper blade 30 or 32 on the windshield glass 12.

As shown in the lower part of FIG. 3, the speed of the wiper blade 30 or 32 increases in the opening operation after the start of movement from the stowed position P3, reaches a maximum when the wiper blade 30 or 32 reaches a substantial midway point between the stowed position P3 and the upper reversing position P1, decreases as the wiper blade 30 or 32 approaches the upper reversing position P1 after passing the substantial midway point, and temporarily reaches zero when the wiper blade 30 or 32 reaches the upper reversing position P1.

In the closing operation in which the wiper blade 30 or 32 reverses direction at the upper reversing position P1 and moves toward the stowed position P3, the direction of the speed of the wiper blade 30 or 32 is opposite to the direction during the opening operation. Accordingly, absolute values of speed of the wiper blade 30 or 32 are referred to herebelow. The absolute value of the speed of the wiper blade 30 or 32 reaches a maximum when the wiper blade 30 or 32 reaches a substantial midway point between the upper reversing position P1 and the stowed position P3, and decreases as the wiper blade 30 or 32 approaches the stowed position P3 after passing the substantial midway point. The absolute value of speed of the wiper blade 30 or 32 reaches zero when the wiper blade 30 or 32 reaches the stowed position P3.

In FIG. 3, if no external force such as wind pressure or the like acts on the wiper blade 30 or 32 or the wiper arm 26 or 28, the stop position of the wiper blade 30 or 32 is at a stop reference position 90 indicated in FIG. 3. In FIG. 3, the stop reference position 90 is at the stowed position P3.

However, if an external force such as wind pressure due to running of the vehicle or the like acts on the wiper blade 30 or 32 or the wiper arm 26 or 28, the wiper blade 30 or 32 may stop at an actual stop position 92 that is different from the stop reference position 90. In recent years, it has been common for wiper devices to be of a concealed type in which, when the wiper blade 30 or 32 reaches the stowed position P3, the wiper blade 30 or 32 is concealed by the rear end of an engine hood of the vehicle. This concealed type is susceptible to wind pressure caused by running of the vehicle eddying at the rear end of the engine hood; these eddies may cause the wiper blade 30 or 32 concealed by the rear end of the engine hood to move below the stowed position P3.

The actual stop position 92 indicated in FIG. 3 is at the lower side relative to the stowed position P3 that is the stop reference position 90, illustrating a state in which the wiper blade 30 or 32 has been moved below the stop reference position 90 by running wind of the vehicle or the like. Alternatively, if friction on the windshield glass 12 is large, the wiper blade 30 or 32 may stop at the side of the stop reference position 90 that is closer to the upper reversing position P1.

Generally, if the wiper blade 30 or 32 departed from the stop reference position 90 as illustrated in FIG. 3, a wiper motor would be operated again and the wiper blade 30 or 32 would be moved to the stop reference position 90. However, if the wiper blade 30 or 32 that had stopped at the actual stop position 92 were moved again, this might cause unease to a user or concern that the wiper device was malfunctioning or the like. In the present exemplary embodiment, even if the wiper blade 30 or 32 stops at the actual stop position 92, control is not performed to move the wiper blade 30 or 32 from the actual stop position 92 to the stop reference position 90. The state in which the wiper blade 30 or 32 is stopped at the actual stop position 92 is tolerated, and the position of the actual stop position 92 on the windshield glass is memorized in a memory apparatus such as the memory 54 or the like. Hence, when the wiper switch 66 is subsequently switched on, the memorized actual stop position 92 is set as a new position of the stop reference position 90 and a wiping movement of the wiper blade is started from this new stop reference position 90.

In the present exemplary embodiment, the stop reference position 90 may be updated each time movement of the wiper blade 30 or 32 is stopped, with the actual stop position 92 that is the stop position being set as the new stop reference position 90.

Figure 4:
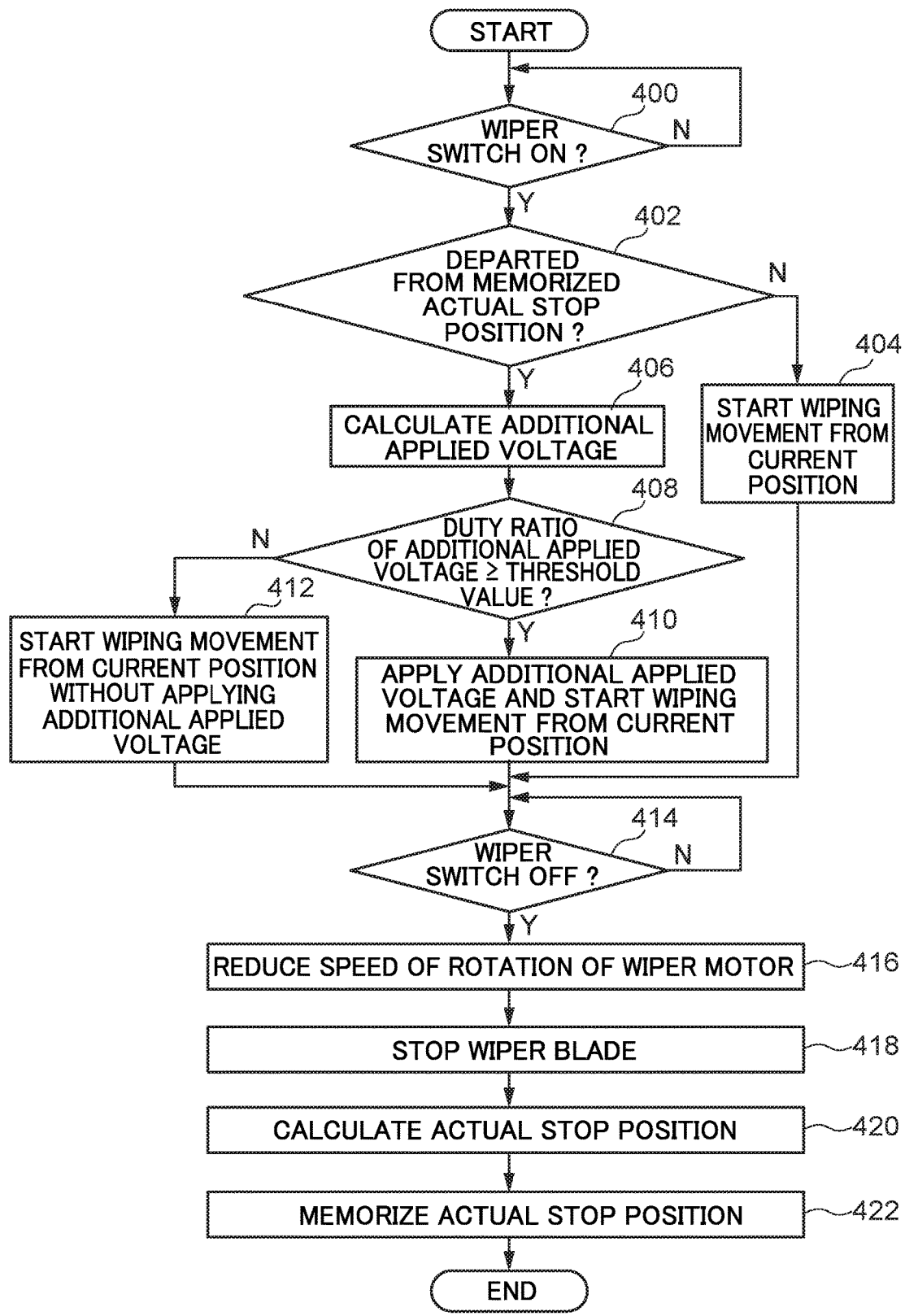
FIG. 4 is a flowchart showing an example of control of a wiping movement of the wiper blade by the wiper control apparatus according to the present exemplary embodiment.

FIG. 4 is a flowchart showing an example of control of a wiping movement of the wiper blade 30 or 32 by the wiper control apparatus 10 according to the present exemplary embodiment. In step 400, a determination is made as to whether the wiper switch 66 has been switched on. When the result of the determination in step 400 is affirmative, in step 402, a stop position (current position) of the wiper blade 30 or 32 when the wiper switch 66 is switched on is compared with the actual stop position 92 (new stop reference position 90) memorized in the memory 54, and a determination is made as to whether the current position has departed from the actual stop position 92. If the wiper blade 30 or 32 has departed from the actual stop position 92, it may be that the wiper blade 30 or 32 has been moved from the actual stop position 92 by an external force such as running wind of the vehicle or the like since the wiper switch 66 was switched off and the wiper blade 30 or 32 was stopped at the actual stop position 92.

If the result of the determination in step 402 is negative, then in step 404, a wiping movement by the wiper blade 30 or 32 is started from the current position. If the result of the determination in step 402 is affirmative, then in step 406, an additional applied voltage that is required when moving the wiper blade 30 or 32 from the current position is calculated.

Figure 5:
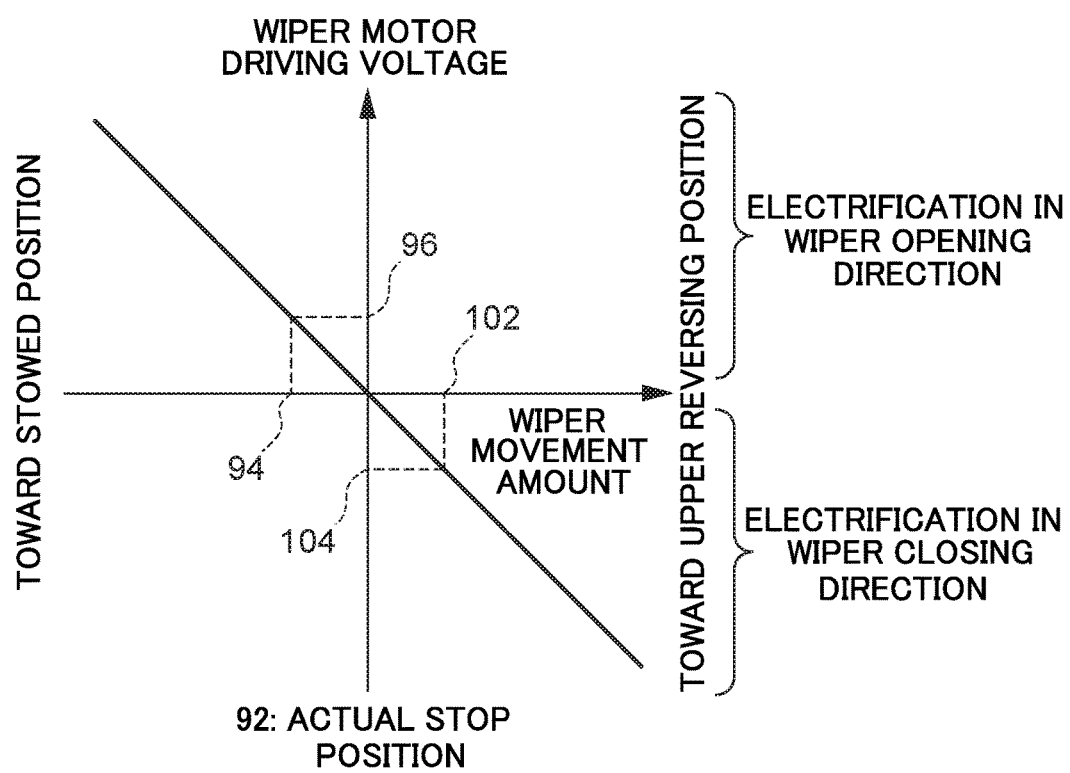
FIG. 5 is a graph illustrating an example of a relationship between current position and additional applied voltage.

FIG. 5 is a graph illustrating an example of a relationship between current position and additional applied voltage. As shown in FIG. 5, the further a current position 94 is offset toward the stowed position from the actual stop position 92, the higher an additional applied voltage 96 during the opening operation to move the wiper blade toward the upper reversing position P1 will be.

If a current position 102 is offset toward the upper reversing position P1, the wiper blade 30 or 32 is moved to the actual stop position 92 by the closing operation that moves the wiper blade 30 or 32 toward the stowed position P3, and reverses direction at the actual stop position 92. Therefore, an additional applied voltage 104 that is required when the current position 102 is toward the upper reversing position P1 has the opposite polarity to the additional applied voltage 96 for an opening operation of the wiper blade 30 or 32.

In step 406, an additional applied voltage is calculated from the current position of the wiper blade 30 or 32 on the basis of the relationship illustrated in FIG. 5. The relationship between current positions and additional applied voltages is specifically determined by testing using actual equipment or the like.

In step 408, a determination is made as to whether a duty ratio of the additional applied voltage 96 or 104 is equal to or larger than a threshold value.

As shown in FIG. 2, of the N-type FETs of the driving circuit 62A, the source of transistor Tr1 and the drain of transistor Tr3 are connected in series, and the source of transistor Tr2 and the drain of transistor Tr4 are connected in series. In the present exemplary embodiment, control is performed such that, for example, transistor Tr3 is off when transistor Tr1 is on; transistor Tr1 and transistor Tr3 are not on at the same time. Similarly, control is performed such that transistor Tr4 is off when transistor Tr2 is on; transistor Tr2 and transistor Tr4 are not on at the same time.

If two FETs that are connected in series as shown in FIG. 2 are on at the same time, the FETs may be destroyed by a DC power supply short circuit. In the present exemplary embodiment, as described above, control is performed such that only one of the FETs that are connected in series is on. However, if switching control exceeds the limit of response speeds of the FETs, then even when one FET has been switched off, that FET may actually still be in the on state. If the other FET is switched on in this state, the two FETs could be destroyed by a DC power supply short circuit.

For example, when the voltage to be applied to a motor is low, that is, when the duty ratio of the applied voltage is small, it may be necessary to switch FETs forming the driving circuit at high speed. Therefore, when the duty ratio is small, there is a risk of a DC power supply short circuit occurring in the FETs of the driving circuit.

In the present exemplary embodiment, as described above, there is a risk of a DC power supply short circuit in the FETs forming the driving circuit if the duty ratio of the additional applied voltage 96 or 104 is less than the threshold value. Therefore, in this situation, the calculated additional applied voltage 96 or 104 is not applied to the motor. The threshold value differs depending on specifications of the FETs forming the driving circuit and is specified as appropriate in accordance with the configuration of the driving circuit.

Accordingly, for the reason described above, the result of the determination in step 408 is negative if the additional applied voltage 96 or 104 is low, that is, if the duty ratio of the additional applied voltage 96 or 104 is below the threshold value, and the result of the determination is affirmative if the duty ratio of the additional applied voltage 96 or 104 is equal to or larger than the threshold value.

If the result of the determination in step 408 is affirmative, in step 410 the additional applied voltage 96 or 104 is applied to the wiper motor 18 or 20. If the wiper blade 30 or 32 is to be moved toward the upper reversing position P1 from the memorized actual stop position 92, the voltage is applied to the wiper motor 18 or 20 and the wiping movement of the wiper blade 30 or 32 is started from the current position.

If the result of the determination in step 408 is negative, in step 412, the additional applied voltage 96 or 104 is not applied and the wiper blade 30 or 32 starts the wiping movement from the current position. In the present exemplary embodiment, when the result of the determination in step 408 is negative, the current position 94 or 102 shown in FIG. 5 that is offset from the actual stop position 92 serves as the new stop reference position 90 instead of the actual stop position 92. Hence, a reference position at which the wiper blade 30 or 32 is stopped may be offset even further from the stop reference position 90. However, when the duty ratio of the additional applied voltage 96 or 104 is less than the threshold value, the offset of position from the actual stop position 92 is small and therefore is not a problem in practical terms.

In step 414, a determination is made as to whether the wiper switch 66 has been switched off. If the result of the determination in step 414 is affirmative, then in step 416, the rotation speed of the wiper motor 18 or 20 is reduced in accordance with positions of the wiper blade 30 or 32 calculated from the output shaft 36 or 38 detected by the turning angle sensor 42 or 44. In specific terms, the rotation speed of the wiper motor 18 or 20 is reduced as the wiper blade 30 or 32 approaches the stop reference position 90.

In step 418, when it is determined from detection results of the turning angle sensor 42 or 44 that the wiper blade 30 or 32 has reached the memorized stop reference position 90, the rotation of the wiper motor 18 or 20 is stopped and the wiper blade 30 or 32 is stopped.

In step 420, the actual stop position 92 of the wiper blade 30 or 32 is calculated from detection results from the turning angle sensor 42 or 44. In step 422, the calculated actual stop position 92 is memorized in the memory 54, and the processing ends.

In the present exemplary embodiment, the wiper blade 30 or 32 may depart from the stop reference position 90, which is the stowed position P3 or the like, due to the action of an external force such as running wind of the vehicle or the like. However, after the wiper blade 30 or 32 stops, the actual stop position 92 of the wiper blade 30 or 32 is set as the new stop reference position and memorized in the memory 54.

In the present exemplary embodiment, even if the actual stop position 92 is at a different position from the previous stop reference position 90, no control is performed after the wiper switch 66 is switched off to move the wiper blade 30 or 32 from the actual stop position 92 to the previous stop reference position 90. When the wiper switch 66 is subsequently switched on, the actual stop position 92 is set as the new stop reference position 90, as in step 404 described above, and serves as the start position for a wiping movement by the wiper blade 30 or 32.

As described above, in the present exemplary embodiment, when the wiper blade 30 or 32 is not stopped at the stop reference position 90 due to the action of an external force or the like, the wiper blade 30 or 32 is not moved from the stop position to the stop reference position 90 but the current stop position is set as the new stop reference position 90.

After the wiper blade 30 or 32 has stopped at a present position (the actual stop position 92), if the position of the wiper blade 30 or 32 is changed further by an external force, then when the wiper switch 66 is subsequently switched on again, movement of the wiper blade 30 or 32 is regularized from the changed stop reference position by the application of an additional voltage to the wiper motor.

However, if a shift of the position of the wiper blade 30 or 32 after the wiper blade 30 or 32 has stopped at the actual stop position 92 is small, this additional voltage is not applied. When the wiper switch 66 is switched on again, movement of the wiper blade 30 or 32 is controlled using the position of the wiper blade 30 or 32 when the wiper switch 66 was switched on as a new stop reference position. Therefore, if the stop position of the wiper blade is disturbed by an external force, a movement of the wiper blade causing a user to feel unease may be prevented.

As an alternative to the tandem-type wiper device 100 that does not include a linking mechanism, the wiper control apparatus 10 according to the present exemplary embodiment may be used for a wiper device with a linking mechanism.

The present invention is not limited by the above recitations. In addition to the above recitations, it will be clear that numerous modifications may be embodied within a technical scope not departing from the gist of the invention.

The disclosures of Japanese Patent Application No. 2014-252360 filed Dec. 12, 2014 are incorporated into the present specification by reference in their entirety.

The invention claimed is:

1. A wiper control apparatus comprising:
    a position calculation section that calculates a position of a wiper blade on a windshield from a turning angle of an output shaft of a wiper motor, the turning angle being detected by a turning angle detection unit;
    a control section that,
        in a case in which an operation signal is inputted, controls the wiper blade to reciprocatingly move between a stop reference position and a reversing position on the windshield and to conduct a wiping movement on the windshield,
        in a case in which a stop signal is inputted, controls the wiper blade to stop on the basis of a calculated position of the wiper blade on the windshield and the stop reference position, and
        in a case in which the operation signal is subsequently inputted, sets a position at which the wiper blade is stopped as a new stop reference position and controls the wiper blade to conduct the wiping movement toward the reversing position from the new stop reference position; and
    a memory unit that memorizes the new stop reference position,
    wherein, when a position of the wiper blade on the windshield, that is calculated by the position calculation section in a case in which the operation signal is inputted, is different from the new stop reference position memorized by the memory unit, the control section calculates an additional applied voltage to be applied to the wiper motor for moving the wiper blade to the new stop reference position, and
    performs control to apply to the wiper motor both the additional applied voltage and a voltage that is to be applied to the wiper motor for causing the wiper blade to conduct the wiping movement from the new stop reference position.

2. The wiper control apparatus according to claim 1, wherein, in a case in which the wiper blade stops at a stop position that is different from the stop reference position, the control section sets the stop position as the new stop reference position.

3. The wiper control apparatus according to claim 1, wherein, if the wiper blade is stopped at the stop reference position, the control section causes the wiper blade to conduct the wiping movement from the stop reference position in a case in which the operation signal is subsequently inputted.

4. The wiper control apparatus according to claim 1, wherein the control section performs the control to apply the additional applied voltage to the wiper motor if a duty ratio of the additional applied voltage is equal to or larger than a threshold value.

5. The wiper control apparatus according to claim 1, wherein
    the operation signal is inputted to the control section in a case in which a wiper switch is switched on, the wiper switch being operable to switch movement of the wiper blade on and off and to switch a speed of the reciprocating movement of the wiper blade, and
    the stop signal is inputted to the control section in a case in which the wiper switch is switched off.

* * * * *

UNITED STATES PATENT AND TRADEMARK OFFICE
CERTIFICATE OF CORRECTION

PATENT NO. : 10,336,300 B2
APPLICATION NO. : 15/534488
DATED : July 2, 2019
INVENTOR(S) : Hiroto Ijima Page 1 of 1

It is certified that error appears in the above-identified patent and that said Letters Patent is hereby corrected as shown below:

On the Title Page

Item (73), the location of the Assignee is incorrectly shown as "Kosai-shi, Shizuoka". The correct location of the Assignee is "Kariya-city, Aichi-pref., Japan".

Signed and Sealed this
Thirty-first Day of March, 2020

Andrei Iancu
*Director of the United States Patent and Trademark Office*